(12) United States Patent
Negre et al.

(10) Patent No.: US 6,334,435 B1
(45) Date of Patent: Jan. 1, 2002

(54) METHOD FOR OPERATING POLLUTION-FREE ENGINE EXPANSION CHAMBER AND EXPANSION CHAMBER THEREFOR

(76) Inventors: Guy Negre; Cyril Negre, both of BP 547 Carros Cedex, Carros (FR), F-06516

( * ) Notice: Subject to any disclaimer, the term of this patent is extended or adjusted under 35 U.S.C. 154(b) by 0 days.

(21) Appl. No.: 09/720,245
(22) PCT Filed: Jul. 9, 1998
(86) PCT No.: PCT/FR98/01483
§ 371 Date: Jan. 4, 2001
§ 102(e) Date: Jan. 4, 2001
(87) PCT Pub. No.: WO00/03123
PCT Pub. Date: Jan. 20, 2000

(51) Int. Cl.[7] .................................................. F02B 33/00
(52) U.S. Cl. ...................................... 123/559.1; 60/597
(58) Field of Search ........................ 123/559.1; 60/605, 60/606, 597, 599

(56) References Cited

U.S. PATENT DOCUMENTS 3,800,763 A * 4/1974 Pouit ...................... 123/119 C
4,026,115 A * 5/1977 Melchior et al. ............. 60/614
4,351,290 A * 9/1982 Melchior ............. 123/559.1 X

FOREIGN PATENT DOCUMENTS

FR        2441057 A  *  6/1980
WO   WO-9637737 A  *  9/1996

* cited by examiner

*Primary Examiner*—Hoang Nguyen
(74) *Attorney, Agent, or Firm*—Jacobson Holman, PLLC

(57) ABSTRACT

The invention concerns a method for operating a pollution-free engine chamber by injecting supplementary compressed air, comprising a suction and compression chamber (1) and an expansion and exhaust chamber (4) independent of each other, which consists in separating the pressure increase process in said expansion chamber by dividing it into the two chambers, an engine chamber (2A) which receives high pressure air and a working chamber (2B) which receives the supplementary compressed air with lower pressure, separated by a quick-operating plug (2c) which communicates them suddenly thereby causing, owing to difference in pressure levels, a wave expanding the engine gas which flows into the working chamber generating a compressive shock wave substantially increasing the pressure level in the chamber shortly before it is communicated with the expansion and exhaust cylinder (4) to produce a work.

6 Claims, 3 Drawing Sheets

METHOD FOR OPERATING POLLUTION-FREE ENGINE EXPANSION CHAMBER AND EXPANSION CHAMBER THEREFOR

The invention relates to the operation of an expansion chamber of a pollution-free or depolluting engine with injection of additional compressed air.

In his published patent application WO 96/27737, the author has described a method for reducing pollution of an engine with an independent external combustion chamber operating on a dual-mode principle with two types of energy, using either conventional fuel of the gasoline or diesel oil type on the highway (in single-mode air-fuel operation) or, at low speed, particularly in towns and suburbs, with an addition of compressed air (or any other non-polluting gas) to the exclusion of any other fuel (so-called single-mode air-air operation, that is to say with the addition of compressed air). In his patent application WO 97/48884, the author has described the installing of this type of engine in single-mode operation on service vehicles, for example town buses, taxis or delivery vans.

In air-fuel mode, the air-fuel mixture is drawn into and compressed in an independent induction and compression chamber. This mixture is then transferred, still under pressure, to an independent and constant-volume combustion chamber where it is ignited in order to increase the temperature and pressure of the said mixture. Once a transfer port connecting the said combustion or expansion chamber to an expansion and exhaust chamber has opened, this mixture will be expanded in the latter chamber to produce work there. The expanded gases are then discharged to the atmosphere through an exhaust pipe.

When operating in air-air mode, at low power, the fuel injector is no longer operated; in this case, a small amount of additional compressed air from an external tank in which the air (or any other gas) is stored at high pressure, for example 200 bar, and at ambient temperature is introduced into the combustion chamber somewhat after the (fuel-free) compressed air from the induction and compression chamber has been let into this combustion chamber. Upon the injection of additional compressed air, this small amount of compressed air at ambient temperature will heat up in contact with the mass of high-temperature air contained in the combustion or expansion chamber, will expand and will increase the pressure obtaining in the chamber to allow work to be delivered upon expansion.

This type of dual-mode or dual-energy (air and gasoline or air and additional compressed air) engine can also be modified for preferential use, in town for example, on all vehicles and particularly on town buses or other service vehicles (taxis, trash-collecting trucks, etc.) in air-compressed air single mode by eliminating all the elements of the engine which operate in conjunction with the conventional fuel.

The engine then runs only in single mode with the injection of additional compressed air into the combustion chamber which thus becomes an expansion chamber. Furthermore, the air drawn in by the engine can be filtered or purified through one or more charcoal filters or using some other method—mechanical, chemical, molecular sieve, or other filters in order to produce a depolluting engine. The use of the term "air" in the current text is to be understood as meaning "any non-polluting gas".

In this type of engine, the additional compressed air is injected into the combustion or expansion chamber at a service pressure determined according to the pressure obtaining in the chamber and appreciably higher than this pressure. This entails relatively high injection pressures, for example of 30 bar.

The problems of the dynamics of the gases in fluid flows have been extensively studied and tested. In supersonic flows, the pressure waves emitted by the moving bodies form envelopes of shapes on the passage of which the air undergoes so-called very high-speed variations and physical properties which result in particular in the appearance of shock waves. Tests and experiments performed with a shock tube have been intended to carry out numerous experiments in the area of dynamics of gases and to determine their properties and in the area of supersonic wind tunnels (shock tunnels). A shock tube consists of two tube parts where a diaphragm is clamped between two ends and where the free ends are closed. One of the parts is known as the driving tube and the other part is known as the test tube and the entire entity is known as the shock tube. By filling the test tube with the gas on which tests are to be performed and by compressing the gas in the driving tube until the diaphragm bursts, a process of pressure equalization then ensues. The high-pressure driving gas expands in the form of an expansion wave and flows into the test tube. It therefore creates a shock wave in the low-pressure gas.

The method of operation of the expansion chamber according to the invention proposes the use of shock and shock wave techniques in subsonic and more particularly supersonic gaseous flows in order to get the best possible output from the engine by obtaining high pressures and temperatures of the gases in the expansion chamber before the said gas is transferred into the expansion and exhaust chamber. It consists in splitting the process of increasing the pressure in the chamber into two stages, by introducing a high-pressure driving gas from the induction and compression chamber into part of the said chamber and, on the other hand, by introducing the additional compressed air into the other part at a markedly lower pressure, then in suddenly bringing the two parts into contact to obtain, because of the pressure difference, a sudden expansion of the driving gas which expands in the form of an expansion wave and flows into the working gas at lower pressure, thereby creating a compression shock wave which makes it possible to considerably increase the total pressure in the chamber shortly before it expands in the expansion and exhaust chamber to produce work.

As a preference, the method of operation of the expansion chamber according to the invention involves ionization of the driving gas before it is introduced into the working chamber, which has the effect of creating waves of electromagnetic nature and of increasing the intensity of the shock wave in the working chamber and of delaying the relaxation phenomena.

The expansion chamber for the implementation of the method is divided into two parts separated by a very high-speed shutter which can bring them suddenly into communication at the chosen moment in the cycle; one of these chambers, known as the driving chamber, is connected to the induction and compression chamber and receives the driving gas therefrom; the second chamber is connected to the expansion and exhaust chamber and receives the additional compressed air; it thus becomes the working chamber. The operation of the expansion chamber according to the invention can thus be understood; first of all, the driving chamber is filled with hot compressed air at high pressure, for example 50 bar, from the induction and compression chamber, while an amount of additional compressed air from a storage tank under high pressure is injected so as to obtain a lower pressure, for example 10 bar, in the working chamber then, shortly before communication with the engine expansion cylinder, the inter-chamber shutter is suddenly opened; as a result, and because of the pressure difference, the driving gas will expand in the form of an expansion wave and will flow into the working chamber where it creates a compression shock wave and considerably increases the pressure in the said working chamber shortly before it is placed in communication with the expansion and exhaust cylinder. This increase in pressure is used to produce the work by expanding the gases in the expansion and exhaust chamber.

According to another feature of the invention, the shapes of the two chambers are in the form of nozzles where the driving chamber opens via a convergent section into a throat closed by a high-speed shutter which allows it to be opened suddenly at the chosen moment in the cycle, and onto the working chamber via a divergent section such that the supersonic jet created when the throat is opened causes the formation of vortexes, which, aside from the shock wave effects, make it possible to produce the desired pressure-increasing effects.

It is possible to calculate and choose the volumes of the driving chamber and of the working chamber, to optimize the shapes and sizes, to create one or more shocks triggering waves and/or vortexes without altering the method of the invention.

It is also possible, within the cycle, to choose the moment that the inter-chamber shutter opens and that the transfer into the expansion chamber occurs, so as to obtain the desired results, namely the highest possible pressure in the expansion chamber at the time of the expansion.

Other objects, advantages and features of the invention will become apparent from reading the non-limiting description of a number of embodiments given by reference to the appended drawings where:

Figure 1:
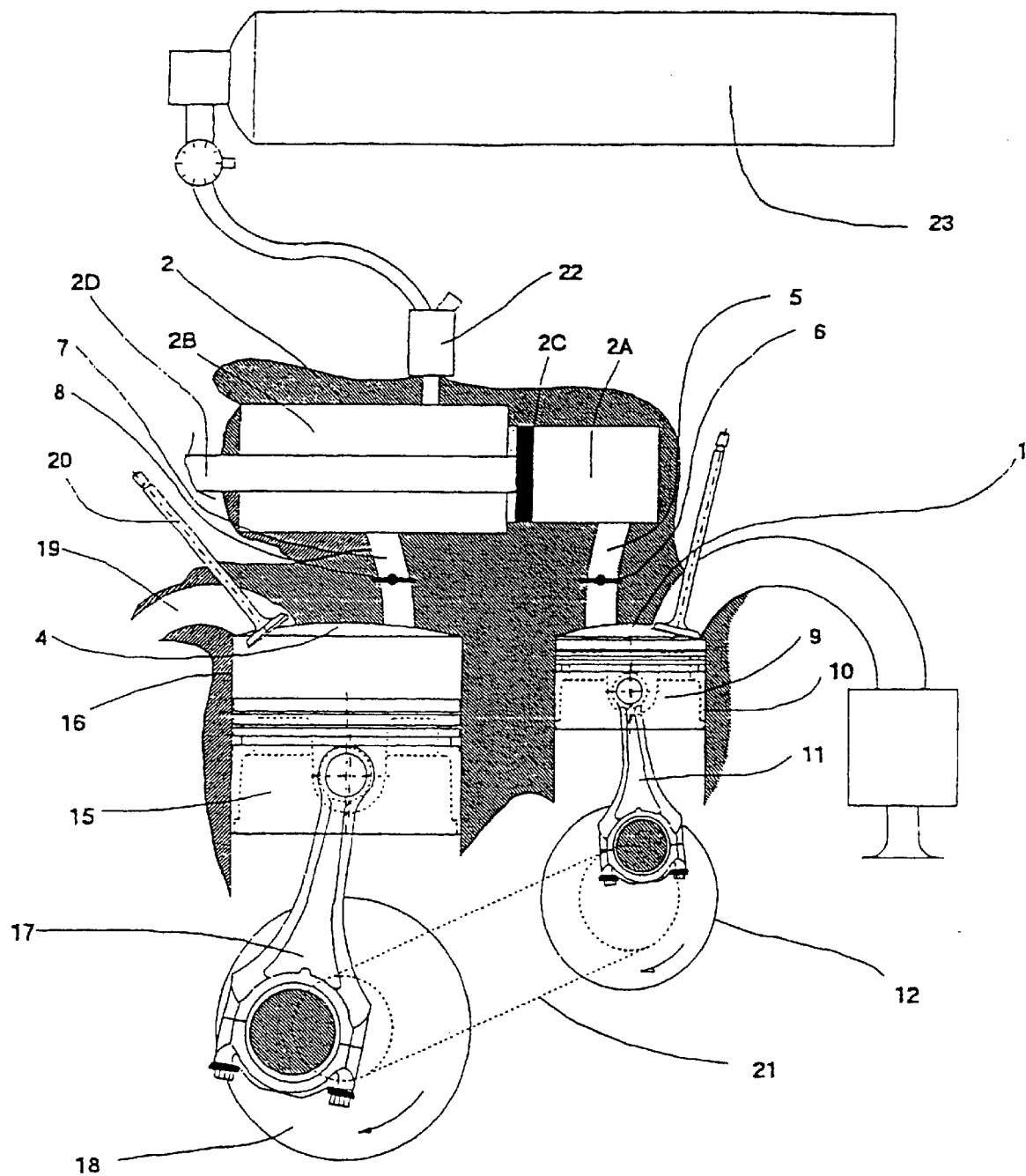
FIG. 1 depicts a view in cross section of an entire engine equipped with the expansion chamber according to the invention.
Figure 2:
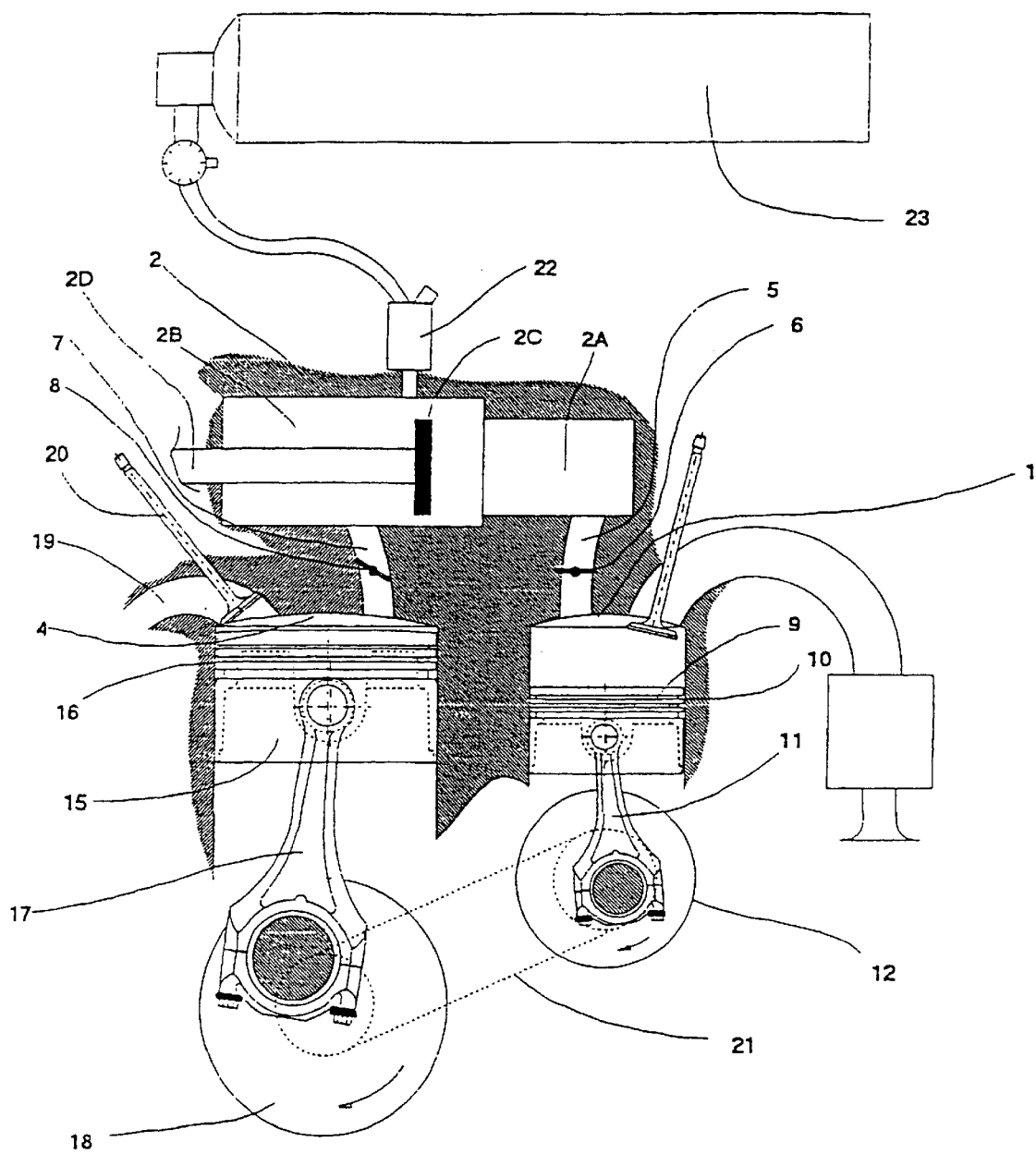
FIG. 2 depicts this same engine shortly before expansion.

FIG. 1, in which the various items are not to scale in order to give a better understanding of the diagrammatically depicted drawing, and viewed in cross section, is one embodiment of an entire engine equipped with the expansion chamber according to the invention. The induction and compression chamber and the expansion and exhaust chamber are each controlled by a connecting rod-crank system and pistons sliding in the cylinders, and it is possible to see the induction chamber and the compression chamber 1, the expansion chamber 2 divided into two parts, the driving chamber 2A and the working chamber 2B, separated by a shutter 2C, and its control 2D. An additional-air injector 22, supplied with compressed air stored in a very high pressure tank 23, is installed in the working chamber 2B. The induction and compression chamber 1 is connected to the driving chamber 2A of the expansion chamber 2 by a duct 5, the opening and closure of which are controlled by a sealed flap 6. The working chamber 2B of the expansion chamber 2 is connected to the expansion and exhaust chamber 4 by a duct or transfer port 7, the opening and closure of which are controlled by a sealed flap 8. The induction and compression chamber 1 operates as a piston compressor unit where the piston 9 sliding in a cylinder 10 is controlled by a connecting rod 11 and a crankshaft 12. The expansion and exhaust chamber 4 controls a conventional engine piston unit with a piston 15 sliding in a cylinder 16 which, via a connecting rod 17, drives the rotation of a crankshaft 18; expanded air is exhausted through an exhaust pipe 19, the opening of which is controlled by a valve 20. The rotation of the crankshaft 12 of the induction and compression chamber 1 is controlled through a mechanism 21 by the engine crankshaft 18 of the expansion and exhaust chamber 4. It goes without saying that the two connecting rods may also be coupled to the same crankshaft, but the solution drawn is more demonstrative of the independence of the chambers. The engine is depicted at compressor top dead center, the sealed flap 6 is closed and the driving chamber 2A of the expansion chamber 2 is filled with air compressed to high pressure by the piston 9, the additional-air injector 22 is or has just been actuated to obtain in the working chamber 2B compressed air at a pressure lower than that obtaining in the driving chamber 2A, the high-speed shutter 2C is then actuated to suddenly place the driving chamber 2A and the working chamber 2B in communication (FIG. 2). Because of the pressure difference, the driving gas will expand in the form of an expansion wave and propagate through the working chamber where it creates a compression shock wave causing a considerable increase in pressure in the working chamber 2B; before the relaxation phenomenon causes this pressure to decay to the pressure that the mixing of the gases contained in the two chambers would produce, and as the piston 15 of the expansion chamber reaches its top dead center, the opening of the passage 7 is brought about by the flap 8, to allow the gases contained in the working chamber to expand until the expansion piston 15 reaches bottom dead center, driving the engine crankshaft 18 and producing work.

Figure 3:
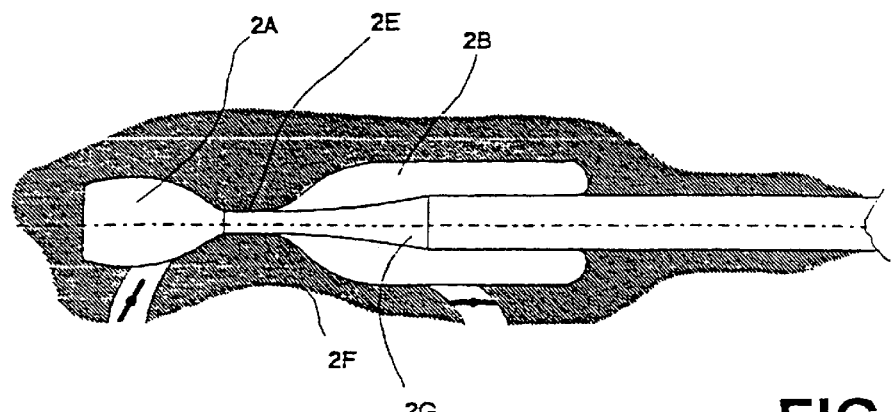
FIG. 3 depicts, in cross section, an expansion chamber in the form of a nozzle.

FIG. 3 depicts a view in longitudinal section of another embodiment of the expansion chamber according to the invention, where the general outline of the chamber is in the form of a nozzle making it possible, during operation, to generate the formation of toroidal vortexes. The driving chamber 2A is connected to the working chamber 2B by a throat 2E in which a sliding piston 2G provides the mutual separation. In the inlet throat just before the divergent there is a flat increase in section 2F accompanied by a return intended, upon opening by the piston, to create the shock wave and encourage the creation of vortexes depicted symbolically in FIG. 4. The driving chamber 2A containing the driving gas at high pressure converges towards the inlet throat 2E, the diameter of which is chosen according to the desired Mach number, opening onto the diverging walls of the working chamber 2B. A piston-shutter rod 2G separates the two chambers and forms a central core which will cause annular flow. Upon operation and at the chosen moment in the engine cycle, the shutter piston 2F retires and suddenly places the two chambers in communication when its head uncovers the flat increase in section 2F. Because of the pressure difference, the gas contained in the driving chamber 2A expands into the working chamber 2B, creating a compression shock wave therein. The presence of the shutter piston 2G causes the flow to separate and encourages the creation of vortexes.

Figure 4:
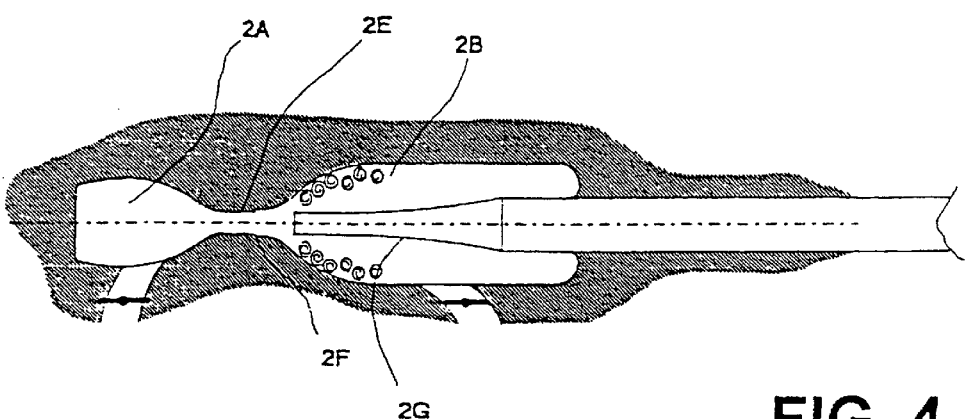
FIG. 4 depicts this same chamber with its shutter open.
Figure 5:
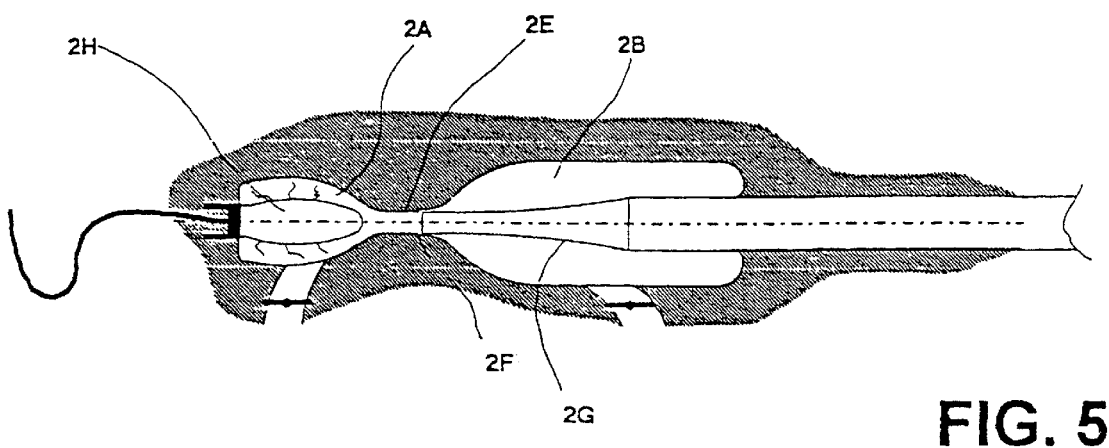
FIG. 5 depicts an expansion chamber according to the invention, the driving chamber of which is fitted with a cathode.

FIG. 5 depicts an expansion chamber according to the invention, similar to the one described in FIGS. 3 and 4, where a cathode 2H intended to ionize the gas has been introduced into the driving chamber 2A with a view to creating waves of electromagnetic nature, to increasing the intensity of the shock wave and to delaying the relaxation phenomena.

Of course, the invention is not in any way restricted to the embodiments described and depicted; several entities such as those described may be grouped together and produced in the manner of multicylinder engines, the shapes and sizes may vary and it can be modified in numerous ways accessible to those skilled in the art, according to the envisaged applications, without departing from the spirit of the invention as defined by the claims.

What is claimed is:

1. Method of operation of an engine comprising an expansion chamber, an induction and compression chamber (1) and an expansion and exhaust chamber (4) which are independent, with the injection of an additional compressed non-polluting gas into the expansion chamber (2) in which a process of pressure increase occurs, characterized in that it consists in splitting the process of increasing the pressure in the expansion chamber into two stages, by introducing, on the one hand, a high-pressure driving gas from the induction and compression chamber into part of the expansion chamber and by introducing non-polluting so-called "working gas" on the other hand, the additional compressed into the other part of the expansion chamber at a pressure markedly lower than the pressure obtaining in the first part, then in suddenly bringing the two parts into contact to obtain, because of the pressure difference, a sudden expansion of the driving gas which expands in the form of an expansion wave and flows into the working gas, thereby creating a compression shock wave which makes it possible to considerably increase the total pressure in the expansion chamber shortly before it expands in the expansion and exhaust chamber to produce work.

2. Method of operation of an expansion chamber according to claim 1, characterized in that the shape of the expansion chamber is tailored to the creation of vortexes which amplify the effects of the compression shock wave.

3. Method of operation of an expansion chamber according to claim 1, characterized by ionization of the driving gas which ionization creates electromagnetic waves to increase the intensity of the shock wave and delay the onset of relaxation phenomena.

4. Engine with the injection of an additional compressed non-polluting gas for implementing the method of claim 1, consisting of an induction and compression chamber (1), of an expansion and exhaust chamber (4) and of an expansion chamber (2) which are separate, in which engine a small amount of additional compressed non-polluting gas from an external tank (23) in which the gas is stored under very high pressure is introduced into the expansion chamber (2), characterized in that the expansion chamber (2) is divided into two parts (2A, 2B) separated by a very high-speed shutter (2C) which brings them suddenly into communication at the chosen moment in the cycle, one of these parts, known as the "driving chamber" (2A), is connected to the induction and compression chamber (1) and receives the high-pressure driving gas therefrom, the second part, the so-called "working chamber" (2B), is connected to the expansion and exhaust chamber (4) and receives the additional compressed non-polluting gas, a compression shock wave developing when the inter-chamber shutter (2C) is suddenly opened as a result of the pressure difference, causing a significant increase in pressure shortly before communication with the expansion and exhaust chamber (4), to produce work.

5. Engine with the injection of an additional compressed non-polluting gas according to claim 4, characterized in that the two parts (2A, 2B) of the expansion chamber (2) are in the form of nozzles where the driving chamber (2A) opens via a convergent section into a throat (2E) closed by the very high-speed shutter (2G) which allows it to be opened suddenly at the chosen moment in the cycle, and onto the working chamber (2B) via a divergent section such that the supersonic jet created when the throat is opened causes the formation of vortexes which, aside from the shock wave effects, make it possible to produce the desired pressure-increasing effects.

6. Engine with the injection of an additional compressed non-polluting gas according to claim 4, characterized in that the driving chamber (2A) comprises a cathode (2H) which allows the driving gas to be ionized before it is introduced into the working chamber (2B), this having the effect of creating waves of electromagnetic nature, of increasing the intensity of the shock wave in the working chamber (2B), and of delaying the relaxation phenomena.

* * * * *